March 14, 1939.   H. WAGNER   2,150,874
FROG AND MINNOW BAIT HARNESS
Filed April 12, 1937

INVENTOR.
HENRY WAGNER,
BY
ATTORNEY.

Patented Mar. 14, 1939

2,150,874

UNITED STATES PATENT OFFICE 2,150,874

FROG AND MINNOW BAIT HARNESS

Henry Wagner, Milwaukee, Wis.

Application April 12, 1937, Serial No. 136,266

6 Claims. (Cl. 43—40)

This invention relates to bait harnesses and more particularly to a frog and minnow bait harness, although certain features thereof may be employed with equal advantage for other purposes.

It contemplates more especially the provision of an improved frog and minnow bait harness that will effectively confine a live bait without impairing its activity so as to utilize such for fishing purposes with more effective results.

Numerous types of bait harnesses have heretofore been proposed, but these have not proven entirely satisfactory because they are cumbersome in construction and either grasp the bait too tightly so as to impair its life or else require a comparatively heavy harness that renders the use thereof rather awkward and ineffective.

Then, too, harnesses of known construction unduly conceal the bait where there is sufficient freedom to confine such without impairment thereto. Such harnesses that have heretofore been proposed and expose a substantial portion of the bait, grasp the live bait so tenaciously as to impair the life thereof.

One object of the present invention is to simplify the construction and improve the operation of devices of the character mentioned.

Another object is to provide a simple and improved bait harness that is adjustable to effectively retain live bait without impairment thereto.

Still another object is to provide a simple and inexpensive bait harness that is of light construction and adjustable to live bait of varying size and shape.

A further object is to provide a simple bait harness that consists of light resilient wires serving to effectively confine and expose a bait without impairment to its life.

Still a further object is to provide a simple wire bait harness that exposes a substantial portion of live bait with sufficient freedom and effective retention for the purpose set forth.

Other objects and advantages will appear from the following description of an illustrative embodiment of the present invention.

Figure 1:
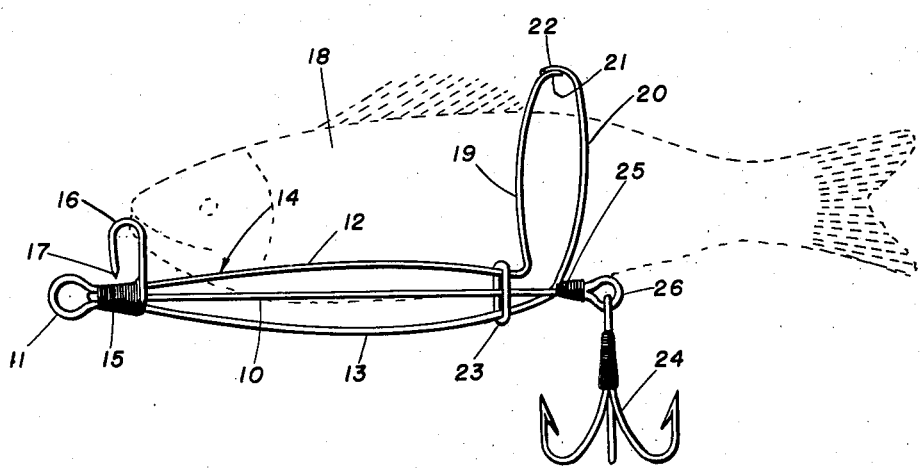
Figure 1 is a perspective view of a device embodying features of the present invention, a minnow bait being shown in dotted outline to clarify the illustration as to the purpose thereof.

The structure selected for illustration comprises an elongated member such as a wire 10 that terminates at the forward extremity in any type of fishing line connecting medium such as an eyelet 11 detachably or otherwise secured to the elongated member 10. In the present embodiment, however, the eyelet 11 constitutes an intermediate portion of normally divergent arms 12 and 13 of a wire 14 that is bent to present the eyelet intermediate the length thereof and is anchored to the longitudinal elongated wire 10 disposed therebetween by means of any suitable fastening expedient such as a wire 15 that is convolutely wound around the base of the divergent arms or members 12 and 13 to serve as a securing medium therefor.

The convolutely wound wire 15 preferably though not essentially terminates in a substantially U-shaped hook 16 that has its free extremity 17 terminating substantially in alignment with or proximate to the longitudinal elongated wire 10 so as to pierce the lip of any bait such as a minnow 18 and still be shielded by the eyelet 11 so as to preclude the accumulation of weeds or other foreign matter. The plane of the substantially U-shaped lip securing hook 16 is disposed angularly to the longitudinal elongated wire 10 so as to enable the piercing of the lip of a minnow 10 or other bait 18 and still provide the necessary protection thereto by the eyelet 11 for the purpose set forth.

The normally divergent arms or members 12 and 13 are resilient so as to assume a normally outward inclination with the free ends supported for a distance to accommodate the bait 18 of any size for which the harness is designed. As shown, the normally divergent resilient wire members 12 and 13 terminate in laterally offset loop segments 19 and 20 that are complemental to each other and are adapted to embrace the body of the bait 18 at a position slightly below the largest diameter thereof. The complemental loop segments 19 and 20 preferably though not essentially constitute an integral part of the normally divergent resilient wires 12 and 13 and serve to securely hold the bait 18 without interfering with its locomotive activities or impairing the life thereof in that the piercing engagement of the lip of the bait by the hook 16 does not cause appreciable injury nor interfere with the life of the bait 18 or its ability of locomotion.

In order to have the complemental loop segments 19 and 20 overlap at their extremities 21 and 22 or to embrace the bait 18 with sufficient tension so as to retain it in position along the elongated wire or lip 10, a slip ring 23 envelops the normally divergent wires 12 and 13 so as to render such displaceable along the length thereto to open and close the complemental loop segments 19 and 20 depending upon the position of the slip ring 23 along the length of the divergent members 12 and 13. It is to be noted that the slip ring 23 also envelops the primary elongated wire 10 so as to retain such in a substantially common plane to expose most of the bait 18 and still retain such properly and securely harnessed thereto.

Any suitable form of hook 24 may be attached to the rear wall extremity 25 of the elongated wire 10, it serving to hook any fish that may be lowered by the bait 18. The catching hook 24 may be of any desired design depending upon the dictates of commercial practice, and in the preferred embodiment is pivotally connected to the eyelet 26 formed on the extremity of the central elongated wire 10 so as to be flexibly connected thereto and to assume a position in axial alignment with the central wire 10 as the harness 10 and bait 18 are pulled through the water in the customary manner.

Figure 2:
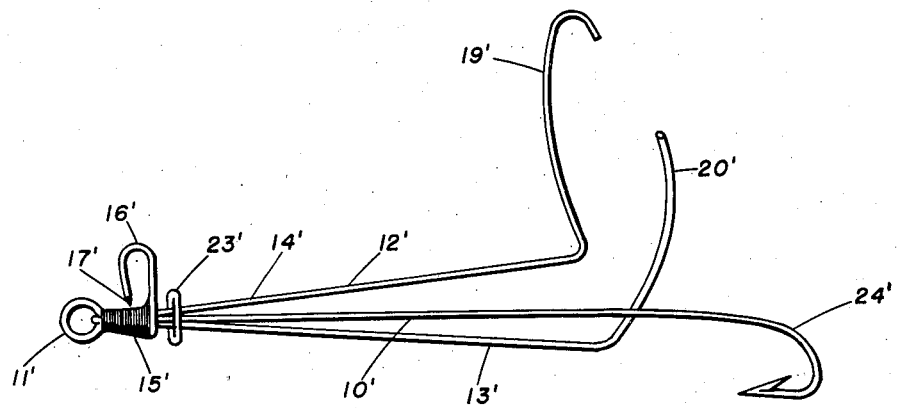
Figure 2 is a perspective view of a modified device embodying features of the present invention with the parts in inoperative relation so far as being able to harness the bait.

In the modified embodiment shown in Figure 2, the construction of the primary elements are substantially the same except that the fish catching hook 24' constitutes an integral part of the central elongated wire 10'. Then, too, the size of the wires and extent of the normally divergent wires 12' and 13' can be appreciably larger together with the complemental loop segments 19' and 30' so as to render such capable of use for frogs as baits or for chubs utilized in the catching of larger fish.

Figure 3:
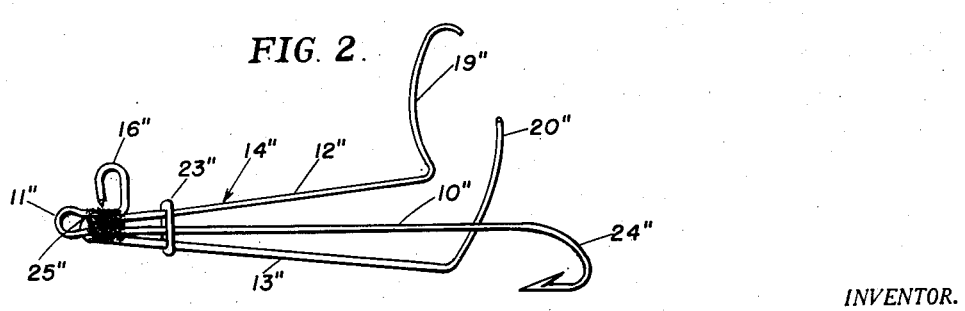
Figure 3 is a diagrammatic view showing the relation of the wire members and a modified form of assembly thereof.

In the further modified embodiment shown in Figure 3, it will be observed that the bait lip securing member 16" constitutes an integral part of the elongated wire member 10", these being interconnected by a substantially U-shaped portion 11" serving as an eyelet to which the fish line is attached or anchored. The divergent arms or wire members 12" and 13" are integrally connected and constitute a single wire member bent to present a substantially U-shaped intermediate portion 25" which is received by the eyelet 11" intermediate the hook 16" and the wire member 10" for joinder thereto in any suitable manner such as by the use of solder or other securing expedients. This mode of assembly may be preferred to that described in connection with the embodiment shown in Figures 1 and 2 and the preference may depend largely upon the dictates of commercial practice.

It will thus be apparent that a very simple, inexpensive and effective harness has been provided that is adjustable to bait of varying size and types so as to securely harness such to the fish line without impairment to the life. Obviously, the bait 18 can be harnessed and released without entailing any appreciable labor, time or effort and the larger portion of the bait is always exposed so as to be more effective for its intended purpose.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In a device of the character described, the combination with an elongated member, of a fish line tying means on the forward extremity of said elongated member, a bait mouth securing member proximate to the forward extremity of said elongated member, a hook extending from the rearward extremity of said elongated member, normally divergent members extending from said elongated member, complemental bait body embracing members extending laterally from said divergent members, and means for varying the complemental relationship of said embracing members to retain or release a bait in longitudinal parallelism with said elongated member.

2. In a device of the character described, the combination with an elongated member, of a fish line tying means on the forward extremity of said elongated member, a bait mouth securing member proximate to the forward extremity of said elongated member, a hook extending from the rearward extremity of said elongated member, normally divergent resilient members extending from said elongated member, complemental bait body embracing members extending laterally from said divergent members, and means encircling said divergent resilient members for varying the complemental relationship of said embracing members to retain or release a bait in longitudinal parallelism with said elongated member.

3. In a device of the character described, the combination with an elongated member, of a fish line tying means on the forward extremity of said elongated member, a bait mouth securing member proximate to the forward extremity of said elongated member, a hook extending from the rearward extremity of said elongated member, normally divergent resilient members extending from said elongated member, complemental bait body embracing loop segments extending laterally from said divergent members, and a displaceable ring member encircling said divergent resilient loop segments for varying the complemental relationship of said embracing loop segments to retain or release a bait in longitudinal parallelism with said elongated member.

4. In a bait harness, the combination with an elongated wire, of a fish line tying eyelet provided on the forward extremity of said elongated wire, a fish catching hook attached to the rearward extremity of said elongated wire, a bait mouth securing member proximate to the forward extremity of said elongated member, normally divergent wires anchored at their point of intersection with said elongated wire, bait body embracing wire offset members extending from the free extremities of said divergent wires, and a member displaceable along said divergent wires to vary the loop defined by said embracing offset members to harness a bait without impairment to its life.

5. In a bait harness, the combination with an elongated wire, of a fish line tying eyelet provided on the forward extremity of said elongated wire, a fish catching hook attached to the rearward extremity of said elongated wire, a bait mouth securing member, normally divergent resilient wires anchored at their point of intersection with said elongated wire, bait body embracing wire offset loop segments extending from the free extremities of said divergent wires, and an enclosed wire ring displaceable along and enveloping said divergent wires to vary the loop defined by said embracing loop segments to harness a bait without impairment to its life.

6. In a bait harness, the combination with an elongated wire, of a fish line tying eyelet provided on the forward extremity of said elongated wire, a fish catching hook attached to the rearward extremity of said elongated wire, a bait mouth securing member proximate to the forward extremity of said elongated member, said bait mouth securing member comprising a substantially U-shaped element angularly disposed to said elongated wire with the free extremity terminating substantially in horizontal alignment with said elongated wire, normally divergent resilient wires anchored at their point of intersection with said elongated wire, bait body embracing wire offset loop segments extending from the free extremities of said divergent wires, and an enclosed wire ring displaceable along and enveloping said divergent wires to vary the loop defined by said embracing loop segments to harness a bait without impairment to its life.

HENRY WAGNER.